(12) United States Patent
Dolin et al.

(10) Patent No.: US 10,366,055 B2
(45) Date of Patent: Jul. 30, 2019

(54) DECREASING DUPLICATES AND LOOPS IN AN ACTIVITY RECORD

(71) Applicant: Microsoft Corporation, Redmond, WA (US)

(72) Inventors: Robert M. Dolin, Seattle, WA (US); Oludare Victor Obasanjo, Renton, WA (US); Douglas R. Pearce, Seattle, WA (US); Seung-Hae Park, Seattle, WA (US); Gyorgy K. Schadt, Redmond, WA (US); Robert W. Piper, Medina, WA (US); Kerstin Weinberg, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 744 days.

(21) Appl. No.: 14/518,790

(22) Filed: Oct. 20, 2014

(65) Prior Publication Data

US 2015/0058303 A1 Feb. 26, 2015

Related U.S. Application Data (63) Continuation of application No. 12/779,057, filed on May 13, 2010, now Pat. No. 8,886,664.

(51) Int. Cl.
*G06Q 10/10* (2012.01)
*G06Q 50/00* (2012.01)
(Continued)

(52) U.S. Cl.
CPC ...... *G06F 16/1748* (2019.01); *G06F 16/9535* (2019.01); *G06Q 10/10* (2013.01); *G06Q 50/01* (2013.01); *H04L 67/22* (2013.01)

(58) Field of Classification Search
CPC ......... G06F 17/30156; G06F 17/30867; G06F 16/1748; G06F 16/9535; G06Q 10/10; G06Q 50/01; H04L 67/22
See application file for complete search history.

(56) References Cited

U.S. PATENT DOCUMENTS 5,819,092 A 10/1998 Ferguson et al.
5,970,391 A * 10/1999 Eaton .................. H04W 88/023
455/503

(Continued)

FOREIGN PATENT DOCUMENTS

| EP | 2034408 A2 | 3/2009 |
| EP | 2034408 A3 | 11/2010 |
| WO | 2010002355 A1 | 1/2010 |

OTHER PUBLICATIONS

"Supplementary Search Report Issued in European Patent Application No. 11781016.8", dated Feb. 18, 2016, 7 Pages.

(Continued)

*Primary Examiner* — Jay A Morrison
(74) *Attorney, Agent, or Firm* — International IP Law Group, PLLC (57) ABSTRACT

The claimed subject matter decreases duplicate entries and loops in an activity record. An exemplary method comprises analyzing a new entry from a user to determine an originating service and a type of activity and extracting an identifying portion of the new entry. The identifying portion includes a predetermined number of characters at a beginning of the entry. Additionally, the predetermined number of characters is based on a likelihood of duplicates in the activity record. The identifying portion is compared to a list of prior entries from the user, and an exclusion action is performed, if the new entry matches one in the list of prior (Continued)

entries. The exclusion action may be to hide the new entry, to delete the new entry, or to collapse the new entry into a matching prior entry.

15 Claims, 5 Drawing Sheets

(51) Int. Cl.
*H04L 29/08* (2006.01)
*G06F 16/174* (2019.01)
*G06F 16/9535* (2019.01)

(56) References Cited

U.S. PATENT DOCUMENTS

| | | | |
|---|---|---|---|
| 6,421,709 | B1 | 7/2002 | McCormick et al. |
| 6,968,421 | B2 | 11/2005 | Conley |
| 8,290,918 | B1* | 10/2012 | Ioffe .................. G06F 17/3002 707/698 |
| 2001/0044795 | A1* | 11/2001 | Cohen ............... G06F 17/30699 |
| 2002/0161788 | A1 | 10/2002 | McDonald |
| 2003/0037034 | A1* | 2/2003 | Daniels ................ G06Q 10/087 |
| 2005/0015710 | A1 | 1/2005 | Williams |
| 2005/0055357 | A1* | 3/2005 | Campbell ................. G06F 8/61 |
| 2005/0120009 | A1* | 6/2005 | Aker ................. G06F 17/30914 |
| 2005/0131967 | A1 | 6/2005 | Holden et al. |
| 2006/0218273 | A1 | 9/2006 | Melvin |
| 2007/0005702 | A1 | 1/2007 | Tokuda et al. |
| 2007/0022374 | A1 | 1/2007 | Huang et al. |
| 2007/0174389 | A1 | 7/2007 | Armstrong et al. |
| 2007/0174394 | A1 | 7/2007 | Jayaweera |
| 2007/0208826 | A1 | 9/2007 | Devolites |
| 2007/0294281 | A1 | 12/2007 | Ward et al. |
| 2008/0155080 | A1 | 6/2008 | Marlow et al. |
| 2008/0306943 | A1 | 12/2008 | Patterson |
| 2009/0048927 | A1 | 2/2009 | Gross |
| 2009/0119603 | A1 | 5/2009 | Stackpole |
| 2009/0220166 | A1 | 9/2009 | Choi et al. |
| 2009/0226098 | A1* | 9/2009 | Takahashi ........... G06F 17/2211 382/218 |
| 2009/0307003 | A1 | 12/2009 | Benyamin et al. |
| 2009/0319577 | A1 | 12/2009 | Obasanjo et al. |
| 2010/0070532 | A1 | 3/2010 | Moribe et al. |
| 2010/0293560 | A1 | 11/2010 | Bland et al. |

OTHER PUBLICATIONS

"Second Office Action Issued in Chinese Patent Application No. 201180023889.X", dated Aug. 14, 2015, 6 Pages.

"First Office Action and Search Report Issued in Chinese Patent Application No. 201180023889.X", dated Dec. 3, 2014, 17 Pages.

Author Unknown, "20 Twitter Plugins to Sync with Instant Messengers", Retrieved at << http://www.aboutonlinetips.com/synchronize-twitter-tweets-with-instant-messenger/ >>, Retrieved Date: Mar. 25, 2010, pp. 13.

Carta, Doriano P., "Crossing the Social Media Streams", Retrieved at << http://webworkerdaily.com/2010/02/17/crossing-the-social-media-streams/ >>, Feb. 17, 2010, pp. 9.

Dsouza, Keith., "Set Facebook Status as Windows Live Messenger Personal Status", Retrieved at << http://techie-buzz.com/softwares/set-facebook-status-as-windows-live-messenger-personal-status.html >>, May 28, 2008, pp. 4.

Kohler, Ed., "Social Networking Update Redundancy", Retrieved at << http://www.technologyevangelist.com/2007/09/friend_update_redund.html >>, Sep. 17, 2007, pp. 4.

Lowensohn, Josh., "Whrrl's Geo-Social Network Comes to the iPhone", Retrieved at << http://news.cnet.com/8301-17939_109-10195947-2.html >>, Mar. 13, 2009, pp. 3.

Rao, Leena., "Social Networks Continue to Rally Around Twitter As LinkedIn Goes Tweet Crazy Too", Retrieved at << http://techcrunch.com/2009/11/09/social-networks-continue-to-rally-around-twitter-as-linkedin-goes-tweet-crazy-too/ >>, Nov. 9, 2009, pp. 2.

"Office Action Issued in European Patent Application No. 11781016.8", dated Jun. 13, 2017, 6 Pages.

* cited by examiner

DECREASING DUPLICATES AND LOOPS IN AN ACTIVITY RECORD

BACKGROUND

Social networking sites have proliferated in the recent years, providing numerous ways to keep family, friends, and associates informed of events and activities. For example, Windows Live® provides an environment in which users can share messages, e-mails, pictures, and the like. Similar sites, like Facebook® and MySpace® allow activities and updates to be shared across multiple platforms, including webpages and mobile clients. For example, these applications allow entries to be posted to a site in a Webpage format. Other sites, for example, Twitter®, can be used for microblogging. These sites may allow both the posting of short messages to a page and the broadcasting of the short messages to subscribing groups, for example, using the short message service (SMS) protocol to send messages to cell phones. Still other sites, such as Foursquare®, are directed at more specific groups and applications. Foursquare® allows participants to share geographically related information, such as business locations, recommendations, and the like, in a game-like environment in which participants communicate using short messages. Until recently, the sites would often be isolated from each other, with each site acting as a single environment for communications.

Some social networking sites have begun allowing other sites to provide information and updates, or have provided users with systems that can access other sites to obtain information or updates. For example, a user's entry into Foursquare®, about services at a particular location, may be pushed to Twitter®, where it is broadcast to a number of subscribers as a message called a "Tweet." The Tweet may also be sent to the user's Facebook® page, where it is displayed on the user's page (e.g., in an area termed a "wall"). Likewise, the Tweet may be pushed to or pulled from other sites, where it may be incorporated into the updates that are displayed. Further, the entry corresponding to the Tweet may be pulled from a site by another site. For example, the user's Windows Live® profile may be configured to pull the entry from the user's Facebook® page.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to a method and a system for decreasing duplicate entries in an activity record such as on a user's page on a social networking site. The duplicates can be created by entries that are pulled or pushed between multiple interconnected social networking sites. For example, an entry to a user's Twitter® feed may be broadcast to Windows Live® and posted to the user's page. If the entry is also sent to the user's MySpace® page, and the Windows Live® page is configured to pull new entries from the MySpace® page, a duplicate entry may result. Further, if other social networking sites are configured to pull content from the user's MySpace® page, and push their content to the user's Windows Live® page, this may create loops, in which entries are continuously made to each page.

One exemplary implementation relates to a method that decreases duplicate entries in an activity record. The method operates by analyzing a new entry from a user to determine an originating service and a type of activity. An identifying portion of the new entry can be extracted or calculated using a portion of the new entry. The identifying portion can be compared to a list of prior entries. The list of prior entries includes the identifying portion of previous entries extracted or calculated using the same algorithm. As used herein, the term "list" is not meant to imply any particular data structure. The data may be stored in a list type variable, a relational database, a displayed list of postings, or any other data structure. The new entry is excluded if the new entry matches one in the list of prior entries. For example, the new entry may be deleted, hidden, or collapsed with a matching prior entry. As used herein, the term "hidden" can indicate that the list of prior entries is updated with the new entry, but the new entry is not displayed or posted to a user's webpage or news feed. As used herein, the term "collapsed" can indicate that metadata that identifies the new entry is added to the metadata for a matching entry on the list of prior entries. If the new entry does not match an entry on the list of prior entries, it can be posted to the user's page or news feeds. The subject innovation may also be used to scan entries from a user's associates to identify and decrease duplicate postings in news feeds.

An exemplary system decreases duplicate postings on a server. For example, the server may host a social networking site on which a large number of users have pages. The system has a processing unit and a system memory, wherein the system memory comprises a list of prior activities for a user, and code used by the processing unit. The code may direct the processing unit to analyze a new entry for a user to determine an originating service and a type of activity. The code may also direct the processing unit to extract an identifying portion of the new entry, compare the identifying portion to the list of prior entries, and, if the new entry matches one in the list of prior entries, perform an exclusion action. The exclusion action may be to delete the new entry, hide the new entry, or collapse the new entry into a matching prior entry.

Another exemplary embodiment of the subject innovation provides a non-transitory computer-readable medium that includes code to direct the operation of a processing unit. The code may direct the processing unit to analyze a new entry from a user to determine an originating service and a type of activity. The code may also direct the processing unit to extract an identifying portion of the new entry from the user, compare the identifying portion to a list of prior entries from the user, and perform an exclusion action, if the new entry matches one in the list of prior entries. The exclusion action may comprise deleting the new entry, hiding the new entry, or collapsing the new entry with a matching prior entry.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "engine," "manipulator" and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media. Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The subject innovation relates to a method and a system for decreasing loops and duplications in activity records such as on a social networking site. In particular, exemplary embodiments relate to a filter system that analyzes an incoming entry to a social networking site to determine if the entry has already been received and posted. If so, the filter may hide the entry without displaying it or forwarding it on to other sites. In exemplary embodiments, the filter may collapse the entry with the previously received entry, for example, combining metadata from the new entry with the previous entry. In some embodiments, the new entry may be deleted if it is identified as a duplicate of a previous entry. This may be more clearly explained by referring to a group that may be formed from social networking sites, as shown in FIG. 1.

Figure 1:
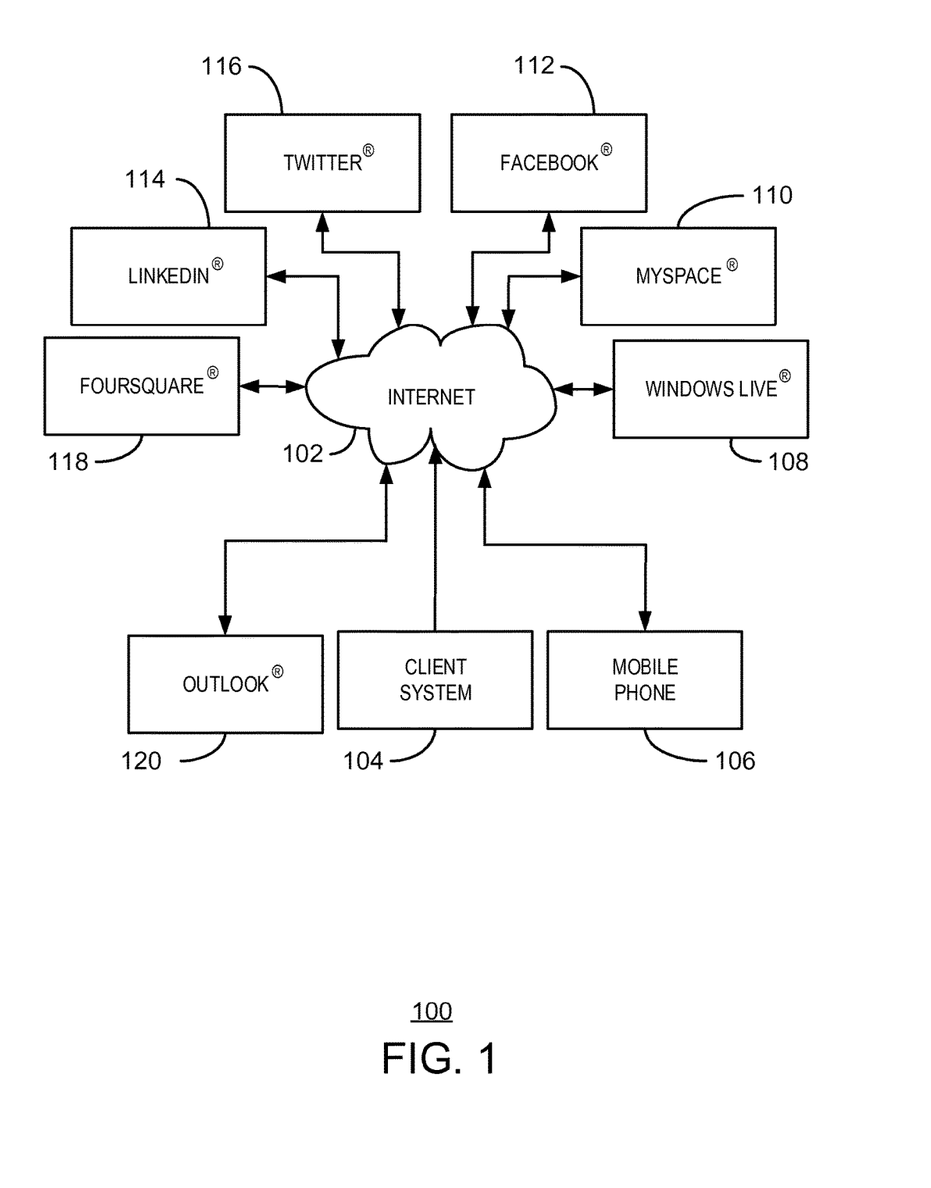
FIG. 1 is a diagram of a number of possible social networking sites that may be accessed over the Internet by various communication devices.

FIG. 1 is a diagram of a number of possible social networking sites that may be accessed over the Internet by various communication devices. As shown in FIG. 1, the Internet 102 may be used to provide communications between a user on a client system 104, or a mobile phone 106, and various sites. As used herein, the Internet 102 may also include subsidiary networks, such as wide area networks (WANs), local area networks (LANs), wireless networks, or any other networks used to access the Internet 102. Further, the subject innovation is not limited to operating over the Internet 102, but may be implemented on a local network, such as a corporate LAN or WAN. In this exemplary embodiment, the social networking site may be a private site, for example, used by the employees of a corporation.

The sites may include, for example, Windows Live® 108, MySpace® 110, Facebook® 112, and business networking sites, such as LinkedIn® 114. These sites may provide a user with a dedicated page for posting pictures, comments, activities, and the like. Other sites may be used for broadcasting text messages, such as Twitter® 116, Foursquare® 118, and the like. The sites may also communicate with e-mail programs, such as Outlook® 120, among others.

Although the sites may be used to update activities for users, as mentioned before, they have not generally updated each other from a single posting. However, recent developments allow an entry to one site, such as a tweet posted by Twitter® 116 to be broadcast to and posted by other sites, such as to a user's wall in Facebook® 112. Further, sites may be configured to pull entries and other content from other sites. For example, a user's page on Windows Live® 108 may be configured to pull entries from the user's page on MySpace® 110. As the number of sites updated by a user increases and the number of interconnections become more complex, there is a possibility of duplicate entries being posted to an activity record. Further, as user's set up multiple sites to update entries from each other, loops may occur, for example, where entries are continuously passed among a group of sites. The creation of duplicate postings and loops in activity records can be further explained by examining a possible data flow, as discussed with respect to FIG. 2.

Figure 2:
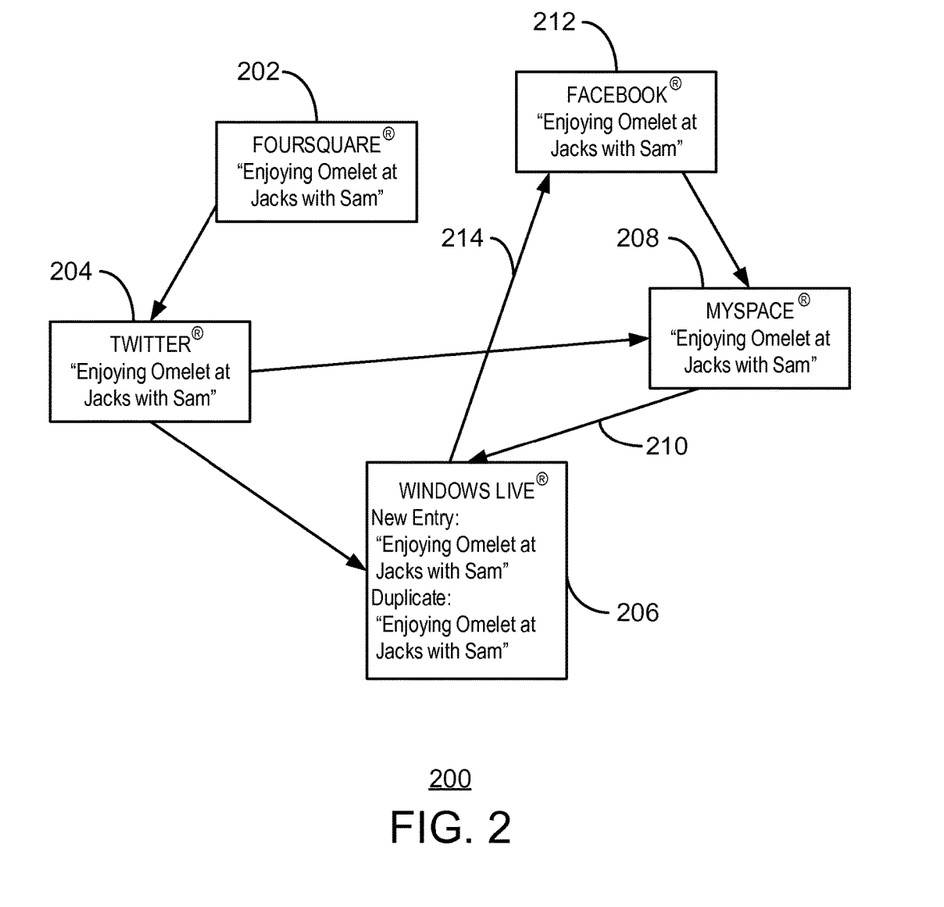
FIG. 2 is a diagram that shows the flow of data through a number of social networking sites configured to update each other from a single entry.

FIG. 2 is a diagram of an exemplary data flow that may lead to the creation of duplicates and loops in activity records. In this example, a user posts an update to his or her account at Foursquare® 202, e.g., a short text message: "Enjoying omelet at Jacks with Sam." Foursquare® 202 can be configured to post the update to the user's account at Twitter® 204, from which the message may be broadcast to a number of subscribers. The subscribers may include the user's accounts at Windows Live® 206 and MySpace® 208, in which the entry is posted on the user's page. However, if the user's account at Windows Live® 206 is configured to pull entries from the user's page at MySpace® 208, as indicated by the arrow labeled 210, the user's account at Windows Live® 206 may have a duplicate of the posting.

Further, the user's account at Windows Live® 206 may be configured to post (push) new entries to the user's page at Facebook® 212, as indicated by the arrow labeled 214. If the user's account at Facebook® 212 is configured to post new entries on the user's page at MySpace® 208, as indicated by the arrow labeled 216, a loop may be created. In the loop, each of the user's three pages (Windows Live® 206, Facebook® 212, and MySpace® 208) may be updated from a connection to a proceeding page, creating a list of duplicates. If the duplicates include media files, such as pictures or video, a substantial amount of storage space may be used, potentially locking the user's account when storage limits are reached. Text strings sent to other sites may be marked with an origination string to identify the source of the update, which may be used to check for duplicates and prevent loops, but sites may often truncate messages to the user entered information, deleting the origination string.

Exemplary embodiments of the subject innovation can examine the user-entered portion of an entry and match this against previous activities of the same type. For example, a preselected number of the first characters of a blog entry may be compared to the same number of characters at the beginning of a previous blog entry. The methods discussed herein are not limited to using text strings to identify content. As discussed with respect to FIG. 3, any number of other data may be used to identify content, including the names of attached files, uniform resource locators included in messages, identification of the originating application or service, and the like. Further, the data used to identify content may be a calculated value, such as a fuzzy hash, or other calculated value.

If the entries match, the entry may be hidden. By way of example, the term "hidden" may mean that the entry is posted to the activity list but not displayed on the user's page. Alternatively, the activity may be collapsed with the matching entry. For example, metadata identifying the source and activity may be listed in the activity list, but the text of the entry (and any attached files) may be deleted. In exemplary embodiments, the duplicate entry may be completely dropped, e.g., not added to the activity list and deleted without posting to the user's page or forwarding to any other services.

Figure 3:
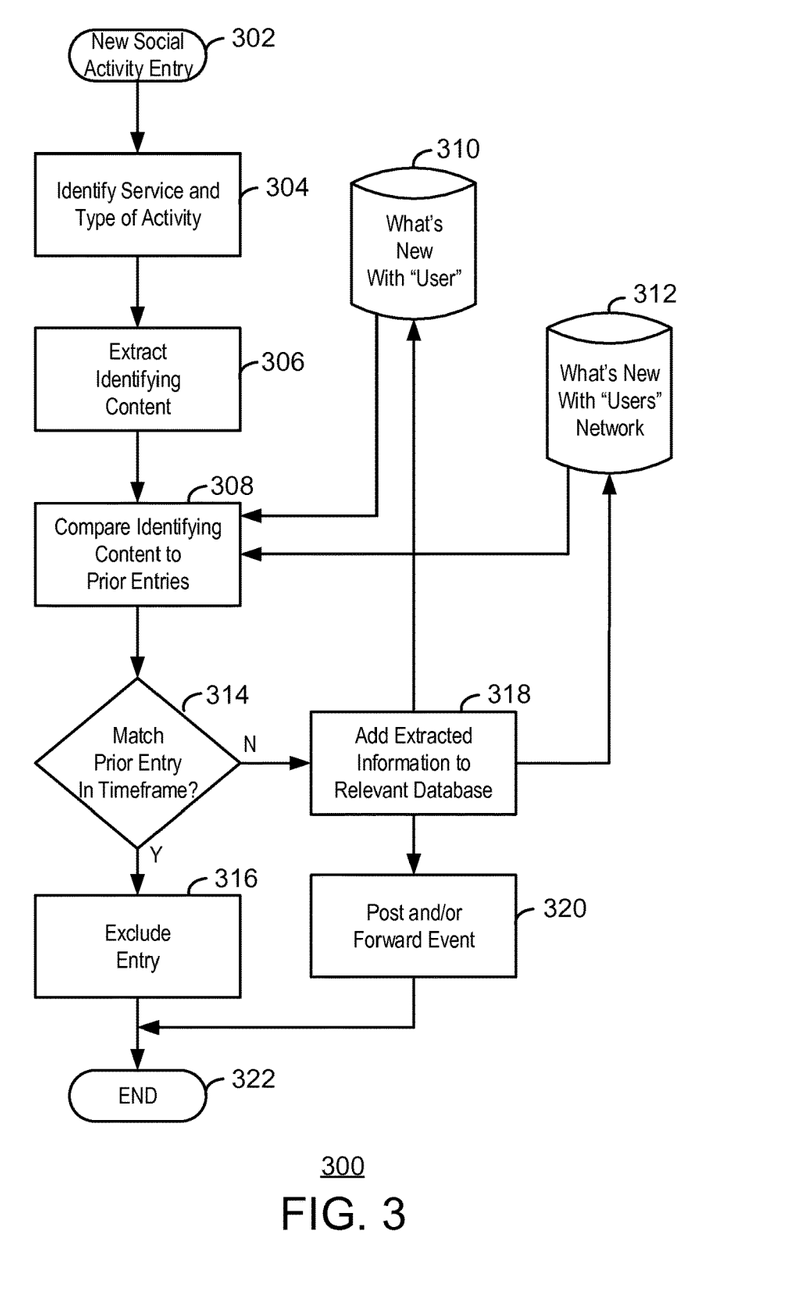
FIG. 3 is a block diagram of a method to prevent duplicates of updated information and loops between different sites.

FIG. 3 is a process flow diagram of a method for filtering entries to decrease duplicates and loops. The method 300 starts at block 302 after a social networking site receives a new social activity entry from another site. The new entry can be pulled by the social networking site from the other site or pushed to the social networking site by the other site. At block 304, the social networking site uses metadata associated with the new entry to identify the service (e.g., Windows Live®, Twitter®, Facebook®, MySpace®, or the like), and the type of activity (e.g., a status update, a blog entry, a photograph, a shared hyperlink, a video, a document, or a bookmark, among others).

This information may be used at block 306 to extract user entered content that may be used to identify the new entry. The identifying content may include such items as the first x characters of a text sequence (where x may be 10, 20, 30, or any number of other characters) or blog entry, a file name for an attached media file, an attached uniform resource locator (URL) of a shared link, and the like. The identifying information is selected so as to balance the computation delays and specificity against the likelihood of duplicates in an activity record. For example, a user may determine that the first 30 characters of a text sequence may eliminate most duplicate entries without being so specific that duplicate entries are not identified. The subject innovation is not limited to extracting a portion of the message for comparison. In some cases, such as short text entries, the entire entry may be used for comparison. The identifying content may also be a value calculated from the content of the message, such as a hash value calculated from a portion of a text entry. So long as the same rules are used for calculating the values from new entries as used for prior entries, the hash value may provide a reliable identifier for comparison with previous values.

Further, the identification of media files having the same name may be useful for eliminating duplicate items that are received in a single news feed, for example, a stream of posts to personal pages received from a number of friends. This may be useful, for example, when a large number of friends post an identical video to their pages, resulting in a large amount of content being duplicated in a news feed.

At block 308, the identifying content may be compared to prior events to determine if the new entry is a duplicate. To implement this comparison, the social networking site may store a first queue 310 of prior entries for the user, for example, under a listing of "What's new with <username>." Similarly, the social networking site may store a second queue 312 of prior entries for a user's linked associates, for example, under a listing of "what's new with 'user's' friends." An example of the information that may be contained in a listing of "what's new with 'user'" is shown in TABLE 1, below.

TABLE 1

Exemplary listing of information stored from entries

| Service | Activity Type | Full data | Key piece of data |
|---|---|---|---|
| Facebook ® | Status | . . . | At Juno enjoying breakfast with |
| Twitter ® | Status | . . . | Dude, how could you have done |
| MySpace ® | Status | . . . | At Showbox catching the Who |
| Twitter ® | Status | . . . | RT @BarackObama Senate is |
| Foursquare ® | Status | . . . | Enjoying omelet at Jack's with |

At block 314, if the new entry matches a current entry in the queues 310 or 312, then process flow proceeds to block 316. For example, if a user's Windows Live® page pulls a status update from MySpace® that reads "Enjoying omelet at Jack's with Sam," the filter may compare the first 30 characters ("Enjoying omelet at Jack's with"), find a match, and identify this as a duplicate entry. At block 316, the duplicate entry can be excluded. For example, the duplicate entry may be dropped, e.g., deleted without being posted, added to the first queue 310 or the second queue 312, or forwarded to another site. In some exemplary embodiments, the duplicate entry may be hidden, e.g., added to a queue 310 or 312, but not posted to the user's page. The duplicate entry may be collapsed with a current entry. In this example, the metadata for the duplicate entry (such as source service, type of activity, and date of receipt) may be added to the prior listing.

As mentioned above, the subject innovation is not limited to text comparisons. Any number of other techniques for identifying duplicate content may be used in exemplary embodiments of the subject innovation. For example, a user may share a link to a website, along with a caption such as "This is my favorite news site"+"http://www.cnn.com." For an update that is categorized as a shared link, the URL of the website can be compared to those of prior shared links, and, if identified as a duplicate, can be eliminated Some services provide links through a redirector, for example, to prevent the spread of computer viruses, phishing sites, or other malware. As an example, a URL published on Windows Live® may have the form:

http://www.fakesteve.net/wp-content/uploads/2010/04/mac-os-x-snow-leopard.jpg.

Another URL, imported from Facebook®, accesses the same site but has the form:

"http://external.ak.fbcdn.net/safe_image.php?d=65abd8d890130fadda34e70df-97eba57&w=130&h=130&url=http%3A%2F%2Fwww.fakesteve.net%2Fwp-content%2Fuploads%2F2010%2F04%2Fmac-os-x-snow-leopard.jpg.

In exemplary embodiments, the filter recognizes that these URLs access the same page and are, therefore, duplicates. For example, the filter may compare URLs in new entries to a table of redirectors, such as "http://external.ak.fbcdn.net," then filter out the original URL and compare the remaining URL to previously posted URLs.

If, at block 314, the new entry does not match any current entry in the queues 310 or 312, then at block 318 the identifying content for the new entry may be added to the listing in the appropriate queue 310 or 312. For example, if the new entry came from a Foursquare™ entry by the user, the identifying content may be added to the first queue 310. Similarly, if the new entry was in a news feed of associates' activities, it can be added second queue 312. Since the comparison is made between the identifying portion of the new entry and the identifying portion of the existing entries, the identifying portion of the entries may be stored as separate metadata that is related to the entry.

At block 320, the entry can be displayed, for example, by posting the entry to the user's page or news feed, and may be sent to other sites, if the page is so configured. The method 300 ends at block 322, where the filter waits for another entry.

It can be noted that a similar process to the method 300, as discussed above, may be used to create the second queue 312 from the first queue 310. In this case, however, the matching activity may be collapsed or hidden instead of deleted. This retains the information concerning the activities of associates while still removing duplicated information.

Figure 4:
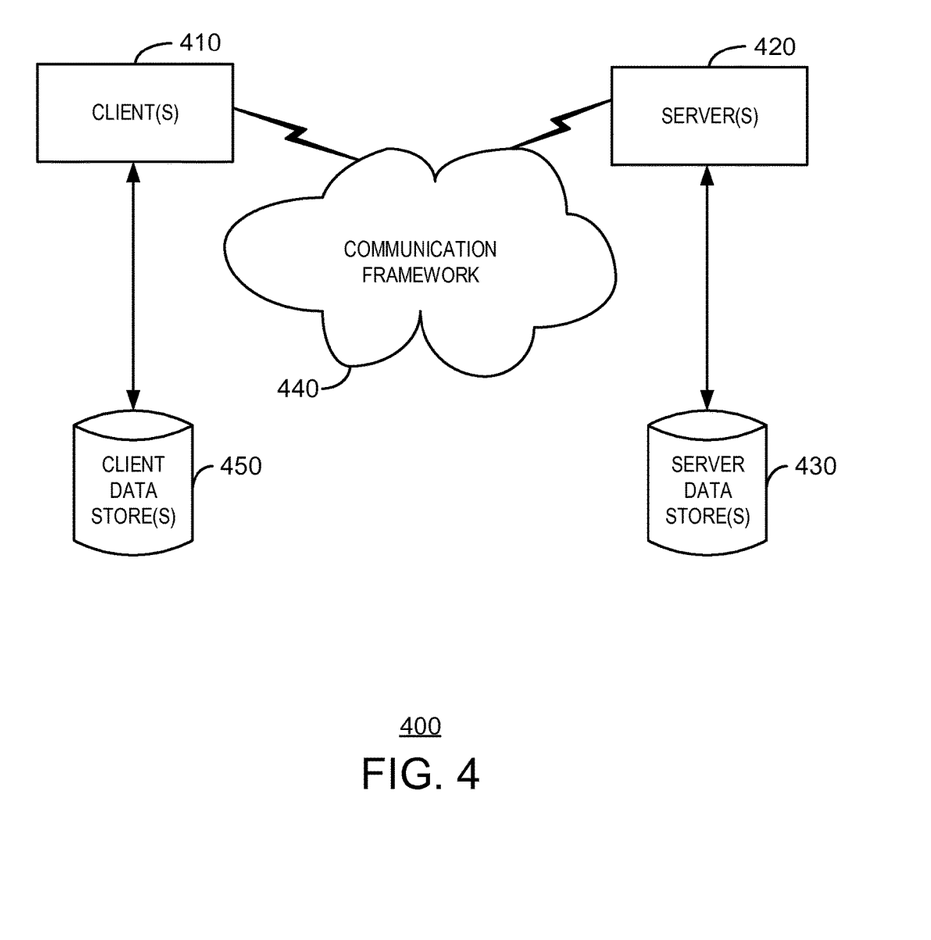
FIG. 4 is a block diagram of an exemplary networking environment, wherein aspects of the claimed subject matter can be employed.
Figure 5:
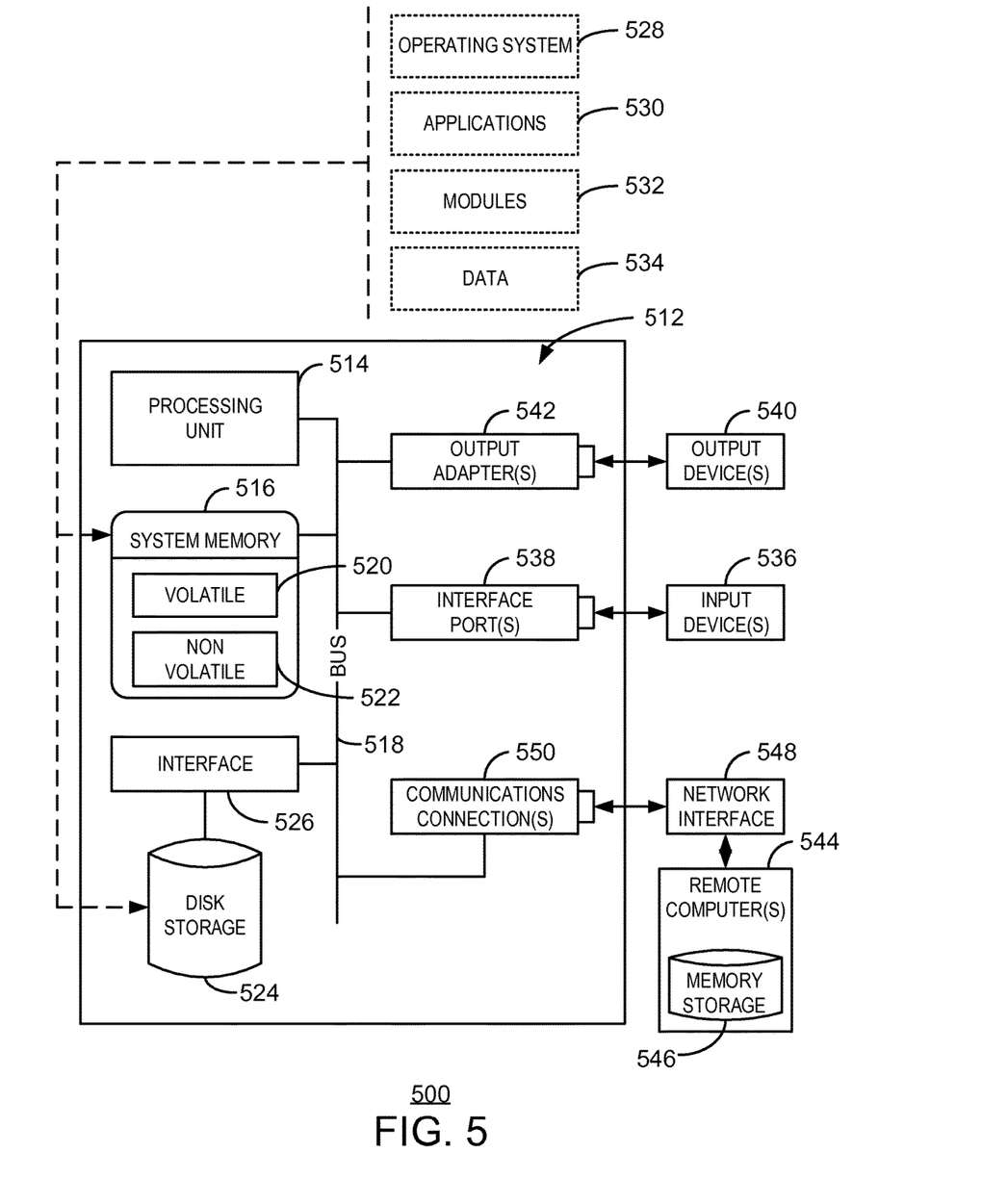
FIG. 5 is a block diagram of an exemplary operating environment that can be employed in accordance with the claimed subject matter.

In order to provide additional context for implementing various aspects of the claimed subject matter, FIGS. 4-5 and the following discussion are intended to provide a brief, general description of a suitable computing environment in which the various aspects of the subject innovation may be implemented. For example, a content filter, as described in the previous figure, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the subject innovation may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 4 is a schematic block diagram of a sample-computing system 400 with which the claimed subject matter can interact. The system 400 includes one or more client(s) 410. The client(s) 410 can be hardware and/or software (e.g., threads, processes, computing devices). The system 400 also includes one or more server(s) 420. The server(s) 420 can be hardware and/or software (e.g., threads, processes, computing devices). The servers 420 can house threads to perform filtering operations by employing the subject innovation, for example.

One possible communication between a client 410 and a server 420 can be in the form of a data packet adapted to be transmitted between two or more computer processes. The system 400 includes a communication framework 440 that can be employed to facilitate communications between the client(s) 410 and the server(s) 420. The client(s) 410 are operably connected to one or more client data store(s) 450 that can be employed to store information local to the client(s) 410. The client data store(s) 450 do not have to be in the client(s) 410, but may be located remotely, such as in a cloud server. Similarly, the server(s) 420 are operably connected to one or more server data store(s) 430 that can be employed to store information local to the servers 420.

As an example, the client(s) 410 may be computers providing access to social networking sites over a communication framework 440, such as the Internet. The server(s) 420 may be social networking sites accessed by the client.

With reference to FIG. 5, an exemplary environment 500 for implementing various aspects of the claimed subject matter includes a computer 512. The computer 512 includes a processing unit 514, a system memory 516, and a system bus 518. The system bus 518 couples system components including, but not limited to, the system memory 516 to the processing unit 514. The processing unit 514 can be any of various available processors. Dual microprocessors and other multiprocessor architectures also can be employed as the processing unit 514.

The system bus 518 can be any of several types of bus structure(s) including the memory bus or memory controller, a peripheral bus or external bus, and/or a local bus using any variety of available bus architectures known to those of ordinary skill in the art.

The system memory 516 is non-transitory computer-readable media that includes volatile memory 520 and nonvolatile memory 522. The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable programmable ROM (EEPROM), or flash memory. Volatile memory 520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 512 also includes other non-transitory computer-readable media, such as removable/non-removable, volatile/non-volatile computer storage media. FIG. 5 shows, for example a disk storage 524. Disk storage 524 includes, but is not limited to, devices like a magnetic disk drive, floppy disk drive, tape drive, Jaz drive, Zip drive, LS-100 drive, flash memory card, or memory stick. In addition, disk storage 524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 524 to the system bus 518, a removable or non-removable interface is typically used such as interface 526.

It is to be appreciated that FIG. 5 describes software that acts as an intermediary between users and the basic computer resources described in the suitable operating environment 500. Such software includes an operating system 528. Operating system 528, which can be stored on disk storage 524, acts to control and allocate resources of the computer system 512. System applications 530 take advantage of the management of resources by operating system 528 through program modules 532 and program data 534 stored either in system memory 516 or on disk storage 524. It is to be appreciated that the claimed subject matter can be implemented with various operating systems or combinations of operating systems.

A user enters commands or information into the computer 512 through input device(s) 536. Input devices 536 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 536 connect to the processing unit 514 through the system bus 518 via interface port(s) 538. Interface port(s) 538 include, for example, a serial port, a parallel port, a game port, and a universal serial bus (USB). Output device(s) 540 use some of the same type of ports as input device(s) 536. Thus, for example, a USB port may be used to provide input to the computer 512, and to output information from computer 512 to an output device 540. Output adapter 542 is provided to illustrate that there are some output devices 540 like monitors, speakers, and printers, among other output devices 540, which are accessible via adapters. The output adapters 542 include, by way of illustration and not limitation, video and sound cards that provide a means of connection between the output device 540 and the system bus 518. It can be noted that other devices and/or systems of devices provide both input and output capabilities such as remote computer(s) 544.

The computer 512 can be a server hosting a social networking site in a networked environment using logical connections to one or more remote computers, such as remote computer(s) 544. The remote computer(s) 544 may be client systems configured with web browsers, PC applications, mobile phone applications, and the like, to allow users to access the social networking site, as discussed herein. The remote computer(s) 544 can be a personal computer, a server, a router, a network PC, a workstation, a microprocessor based appliance, a mobile phone, a peer device or other common network node and the like, and typically includes many or all of the elements described relative to the computer 512. For purposes of brevity, only a memory storage device 546 is illustrated with remote computer(s) 544. Remote computer(s) 544 is logically connected to the computer 512 through a network interface 548 and then physically connected via a communication connection 550. Network interface 548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 550 refers to the hardware/software employed to connect the network interface 548 to the bus 518. While communication connection 550 is shown for illustrative clarity inside computer 512, it can also be external to the computer 512. The hardware/software for connection to the network interface 548 may include, for exemplary purposes only, internal and external technologies such as, mobile phone switches, modems including regular telephone grade modems, cable modems and DSL modems, ISDN adapters, and Ethernet cards.

An exemplary embodiment of the computer 512 may comprise a server hosting a social networking site. An exemplary processing unit 514 for the server may be a computing cluster comprising Intel® Xeon CPUs. The disk storage 524 may comprise an enterprise data storage system, for example, holding thousands of user pages. Exemplary embodiments of the subject innovation may remove duplicate entries on user pages and, further, prevent loops that create duplicate entries. In addition to improving the user experience, the subject innovation may also decrease storage space used on the enterprise data storage system.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc. which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for decreasing duplicate entries in an activity record, comprising:
   analyzing a new entry from a user to determine an originating service and a type of activity;
   extracting an identifying portion of the new entry, the identifying portion comprising a predetermined number of characters at a beginning of the new entry, the predetermined number of characters based on a likelihood of duplicates in the activity record, wherein the identifying portion of the new entry further comprises an identifier corresponding to the originating service and a file name of an attached media file;
   comparing the identifying portion to a list of prior entries; and
   performing an exclusion action in response to detecting the new entry matches one in the list of prior entries, the exclusion action to append metadata of the new entry to metadata of a duplicate entry, prevent forwarding the new entry to a remote computing device, and delete the new entry to reduce storage of data for the user.

2. The method of claim 1, comprising, if the identifying portion does not match to the one in the list of prior entries:
   adding the new entry to the list of prior entries; and
   displaying the new entry.

3. The method of claim 1, wherein the originating service comprises a social networking service, a business networking service, a microblogging service, a text service, an instant messaging service, an e-mail service, a location broadcasting service, or any combinations thereof.

4. The method of claim 1, comprising determining a type of the new entry by matching a user-entered portion of the new entry against previous entries of a same type, wherein the type of activity comprises a blog entry.

5. The method of claim 1, comprising:
   analyzing content of a second new entry for a news feed of associates' activities to determine an originating social network service and a type of activity;
   determining whether the content of the second new entry for the news feed is previously published in a third entry received by a first social network from a second social network, the determining comprising:
   extracting an identifying portion of the second new entry for the news feed, the identifying portion of the second new entry for the news feed comprising a predetermined number of characters at a beginning of the second new entry for the news feed, the predetermined number of characters at the beginning of the second new entry for the news feed based on the likelihood of duplicates;
   matching the identifying portion of the second new entry for the news feed to the third entry; and
   performing a second exclusion action in response to detecting the identifying portion of the second new entry for the news feed matches to the third entry.

6. The method of claim 5, wherein an associate publishes to the second social network.

7. A system for decreasing duplicate entries on a server, comprising:
   a processing unit; and
   a system memory, wherein the system memory comprises a list of prior activities for a user, and code directing the processing unit to:
   analyze a new entry from a user to determine an originating service and a type of activity;
   extract an identifying portion of the new entry, the identifying portion comprising a predetermined number of characters at a beginning of the new entry, the predetermined number of characters based on a likelihood of duplicates in the activity record, wherein the identifying portion of the new entry further comprises an identifier corresponding to the originating service and a file name of an attached media file;
   compare the identifying portion to a list of prior entries; and
   perform an exclusion action, in response to detecting the new entry matches one in the list of prior entries, the exclusion action to append metadata of the new entry to metadata of a duplicate entry, prevent forwarding the new entry to a remote computing device, and delete the new entry to reduce storage of data for the user.

8. The system of claim 7, code directing the processing unit to, if the identifying portion does not match to the list of prior entries:
   add the new entry to the list of prior entries; and
   display the new entry.

9. The system of claim 7, wherein the originating service comprises a social networking service, a business networking service, a microblogging service, a text service, an instant messaging service, an e-mail service, a location broadcasting service, or any combinations thereof.

10. The system of claim 7, comprising determining a type of the new entry by matching a user-entered portion of the new entry against previous entries of a same type, wherein the type of activity comprises a blog entry.

11. The system of claim 7, the code directing the processing unit to:

analyze content of a second new entry to a news feed of associates' activities to determine an originating social network service and a type of activity;

determine whether the content of the second new entry to the news feed is previously published in a third entry received by a first social network from a second social network, the determining comprising:

extracting an identifying portion of the second new entry to the news feed, the identifying portion of the second new entry to the news feed comprising a predetermined number of characters at a beginning of the second new entry to the news feed, the predetermined number of characters at the beginning of the second new entry to the news feed based on the likelihood of duplicates; and matching the identifying portion of the second new entry to the news feed to the third entry in the list of prior entries; and perform a second exclusion action in response to detecting the identifying portion of the second new entry to the news feed matches to the third entry.

12. The system of claim 11, wherein an associate publishes to the second social network.

13. A computer-readable storage media, comprising code directing a processing unit to:

analyze a new entry from a user to determine an originating service and a type of activity;

extract an identifying portion of the new entry, the identifying portion comprising a predetermined number of characters at a beginning of the new entry, the predetermined number of characters based on a likelihood of duplicates in the activity record, wherein the identifying portion of the new entry further comprises an identifier corresponding to the originating service and a file name of an attached media file;

compare the identifying portion to a list of prior entries; and perform an exclusion action in response to detecting the new entry matches one entry jn the list of prior entries, wherein the exclusion action comprises, the exclusion action to append metadata of the new entry to metadata of a duplicate entry, prevent forwarding the new entry to a remote computing device, and delete the new entry to reduce storage of data for the user.

14. The computer-readable storage media of claim 13, the code directing the processing unit to, if the identifying portion does not match to the one in the list of prior entries:

add the new entry to the list of prior entries; and display the new entry.

15. The method of claim 1, wherein the predetermined number of characters correspond to a uniform resource locator (URL) of a website within the new entry.

* * * * *